United States Patent

[11] 3,615,332

| [72] | Inventors | Robert Bourggraff<br>Cologne;<br>Franz Classen, Porz-Grengel, both of Germany |
|---|---|---|
| [21] | Appl. No. | 734,405 |
| [22] | Filed | June 4, 1968 |
| [45] | Patented | Oct. 26, 1971 |
| [73] | Assignee | Erste Deutsche Floatglas GmbH. & Co., OHG Company<br>Porz am Cologne, Germany |
| [32] | Priority | June 7, 1967 |
| [33] | | Germany |
| [31] | | E34137 |

[54] GLASS TANK WITH A FLOAT SUPPORTED BY COOLING ELEMENTS
9 Claims, 8 Drawing Figs.

[52] U.S. Cl. .................................................. 65/178,
65/134, 65/342, 65/356
[51] Int. Cl. .................................................. C03b 5/18

[50] Field of Search ........................................ 65/99, 182, 90, 65, 178, 179, 356, 137, 83, 342, 134

[56] References Cited
UNITED STATES PATENTS

| 1,414,008 | 4/1922 | Brown .......................... | 65/356 X |
|---|---|---|---|
| 1,667,145 | 4/1928 | Diederichs .................. | 65/90 X |
| 3,137,559 | 6/1964 | Van Praet .................... | 65/356 X |

*Primary Examiner*—S. Leon Bashore
*Assistant Examiner*—J. B. Hardaway
*Attorney*—Wilson & Fraser

ABSTRACT: The specification describes the prevention of schlieren in glass drawn off from a tank furnace. In order to prevent the appearance of schlieren in the finished glass a float is arranged in the tank furnace upstream from the draw off channel and cooling elements extend from the float to the walls of the channel in order to exert a cooling action on the surface of the glass.

INVENTORS
ROBERT BOURGGRAFF
FRANZ CLASSEN

BY Wilson & Fraser
ATTORNEYS

GLASS TANK WITH A FLOAT SUPPORTED BY COOLING ELEMENTS

The present invention relates more particularly to the production of a homogeneous stream of glass, for example in a tank furnace, for the continuous production of sheet glass, in which the molten glass is drawn off through a channel for the formation of the glass sheet strip.

As is known by those skilled in the art the different temperatures in the different zones of molten glass in tank furnaces lead to the production of convection currents. These convection currents lead to the mixing together of glass masses with different temperatures, that is to say glass with different histories or ages. This mixing of the glass masses with different histories fosters the formation of schlieren within the molten glass mass. As is also known to those skilled in the art, it is extremely difficult to free the glass mass of such schlieren. The requirements as regards the degree of homogeneity and freedom from schlieren vary: while in many cases a certain amount of schlieren can be accepted, in other cases extremely high requirements are set in this relation. This is especially so in the production of high quality optical glass in which transmission and reflection of light without any distortion is required.

It has been found that the problem of schlieren formation within the cross section of a sheet glass strip is more especially due to constriction of the glass as it is drawn off from the tank furnace, that is to say the bulk supply means into a channel leading to the means for forming the glass into a sheet. This is for example the case in a production of so-called float glass in which the molten glass is drawn off through a channel which is narrow in relation to the width of the tank furnace and is then passed onto a bath of molten tin on which it spreads out to form a layer of even thickness in accordance with the action of gravity and surface tension. Schlieren formation can be especially troublesome in this process for making sheet glass because the schlieren zones have a different viscosity and during the formation of the glass strip also affect the surface. Since in the float method the glass band is not ground so as to be plane parallel, but retains the form it achieves on the bath of molten tin, surface defects due to schlieren are especially noticeable. In consequence in the float method of making sheet glass the homogeneity of the molten glass supplied must be especially high.

A large number of forms of apparatus and methods for homogenizing molten glass are known. These known methods mostly attempt to produce a more or less pronounced intensive mixing of the glass melt, either by means of mechanical stirring means, by introducing gases into the molten glass, or by similar means. In other cases in which the glass melt is supplied to the sheet glass forming means through a channel or feeder, the homogenizing means can be arranged inside the channel. Attempts to prevent the undesired schlieren formation in sheet glass manufacturing plant have, however, mostly remained without any substantial degree of success.

The homogenizing means in accordance with the present invention operates in a manner different to that of the known apparatus. The invention consists in an apparatus for the continuous production of a sheet glass strip in which the glass is drawn off from a bulk supply means with an upright wall through a channel having a smaller cross section than the supply means, characterized in that the apparatus further comprises a float in the glass in the supply means at a position in front of the channel, and, extending between the float and the wall, cooling element means arranged to exert a cooling action upon the glass surface.

It is believed that the manner of operation of the new schlieren prevention means is less due to mixing of the glass melt than to the formation of a barrier which reduces or prevents the formation of certain currents within the glass melt. As a result only selected layers of the glass melt are passed on along the channel and are more homogeneous.

Especially favorable results have been obtained when the float is arranged at such a distance in front of, that is to say upstream from the channel that the viscosity of the glass still allows homogenization but is so high that no substantial segregation or separation of the glass can take place. These conditions are found at a region in the glass in which the viscosity is between 500 and 2,500 poise. In the case of conventional glass compositions and working temperatures this viscosity range is to be found at approximately 1 to 2 m. in front of the channel.

The cooling means preferably comprises liquid circulation means for the removal of heat energy.

In accordance with a further development of the invention both the float and also the cooling element means, which can preferably be in the form of two elongated cooling elements, can be arranged so that they can be adjusted as to height either separately or together. In this manner, when after a certain time has elapsed and other flow conditions occur in the tank furnace which again lead to the formation of schlieren, it is possible, simply by raising or lowering the float and/or the cooling element means, to select other layers within the glass melt which again have a greater degree of homogeneity.

In many cases it is also advantageous to provide means for causing the float to reciprocate, for instance along a straight line, or along a curved path, such as a circular path. In certain cases this may improve the operation of the new apparatus. The speed of movement of the float should be between 0.3 and 1 m. per minute, in accordance with the viscosity of the glass.

It has been found that with this last-mentioned form of the invention a continuous even movement of the float is not always necessary but that, in many cases, an uneven movement or movement alternating with long rest periods gives excellent results.

The invention also consists in a process for the continuous manufacture of sheet glass strip in which glass is drawn off from a bulk supply means along a channel to a glass forming means, the channel having a cross section less than that of the bulk supply means, characterized in that a superficial cooling action is exerted on the glass at a position upstream from the channel the glass viscosity near the cooling means being between 500 and 2,500 poise. The invention will now be further described with reference to the accompanying drawings.

Figure 1:
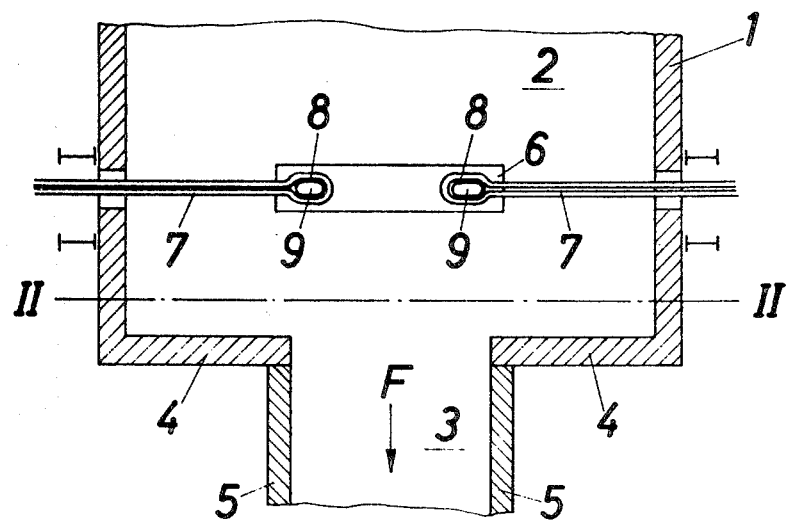
FIG. 1 shows a first embodiment of the invention in plan view.
Figure 2:
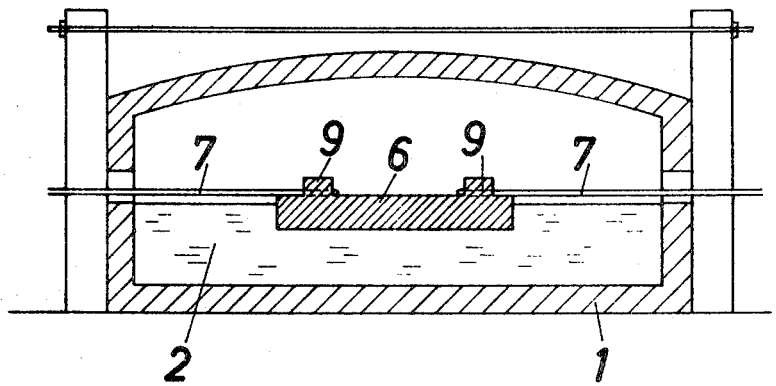
FIG. 2 shows the same embodiment of the invention in section.

In the tank furnace 1 the glass mass 2 is melted and drawn off through the channel 3 in the direction of the arrow F for the formation of the glass strip. The channel 3 is adjacent to the end wall 4 of the furnace and is delimited by sidewalls 5.

About 1 to 2 m. in front of the end wall 4, that is to say upstream from the end wall, there is a float 6 of refractory material. This material of the float must be inert with respect to the glass melt as it must not be attacked by it as this could lead to the formation of schlieren. In order to make the float inert it can be coated with sheet platinum.

The float 6 is held in position by the cooling elements 7 which also perform the function of holding rods and extend through openings provided in the sidewalls of the furnace over the melt. The cooling elements consist of tubes of round or rectangular cross section through which a cooling medium, such as air or water, is arranged to flow. At their inner ends they have eyes 8 which are fitted over corresponding projections 9 on the float and thus hold the float in position.

The action of the cooling elements 7 can be varied in accordance with the choice of cooling medium, by altering their spacing from the surface of the glass melt and by increasing or reducing the effective cooling faces so that wide changes in the degree of cooling can be made. It is also possible to provide a suitable drive means to cause the cooling elements and the float to reciprocate so that there is a mixing action exerted on the glass melt.

Figure 3:
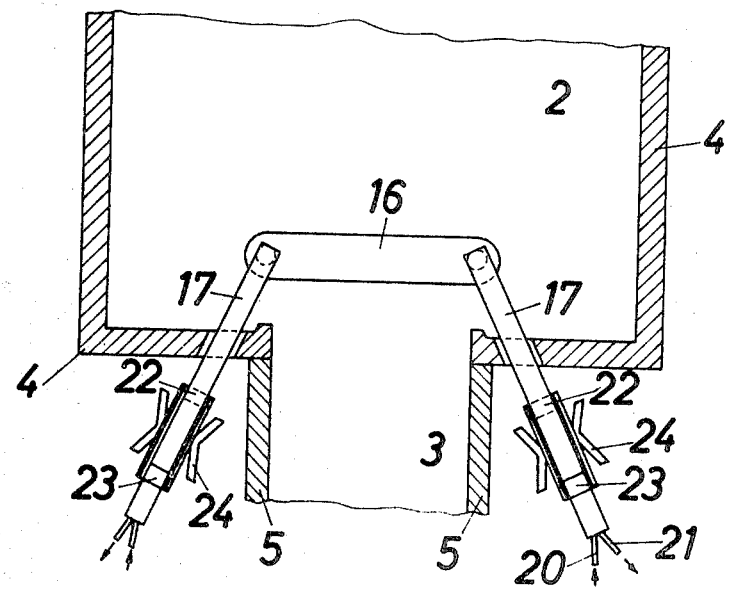
FIG. 3 shows a further embodiment of the invention in plan view.

While in the case of the embodiment of the invention just described the cooling elements are aligned with the axis of the float and extend in from the sidewalls, in the embodiment shown in FIG. 3 the cooling elements 17 extend through corresponding openings in the end wall 4 into the furnace space. As a result the shape of the combined mechanical and thermal barrier in the surface layers of the glass melt can be changed.

Figure 4:
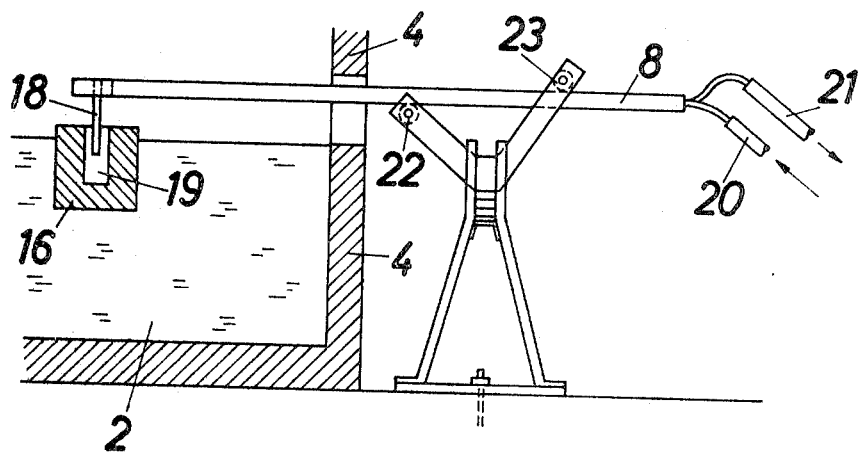
FIG. 4 shows the embodiments of the invention in accordance with FIG. 3 from the side.

The cooling elements 17 are connected with the float 16 by means of a bolt or pin 18 which extends into a suitable recess 19 in the float as shown in FIG. 4. The cooling elements have a circulating cooling medium passing through them which is delivered by a supply connection 20 and leaves the cooling elements through a discharge connection 21. The cooling elements 17 are mounted on support rollers 22, 23 which allow a longitudinal reciprocating movement. As is indicated by reference numeral 24 the support rollers 22,23 are so mounted that an angular movement of the cooling element 17 in a horizontal plane is also possible. Furthermore, the cooling elements are mounted so as to adjustable as to height.

Figure 5:
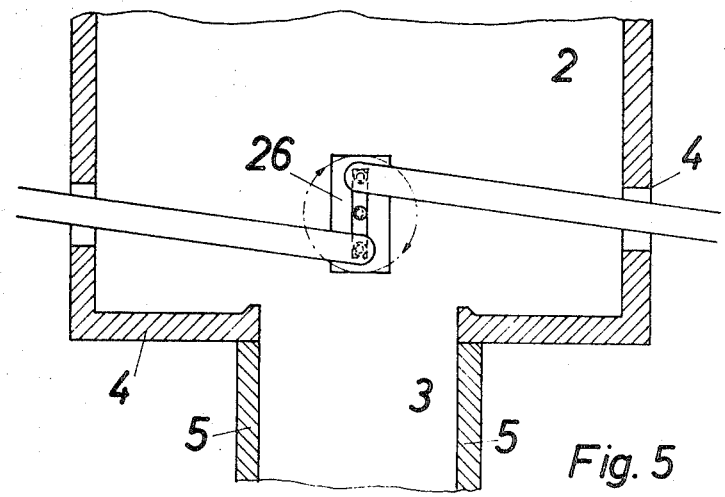
FIGS. 5 and 6 show further embodiments of the invention in plan view.
Figure 6:
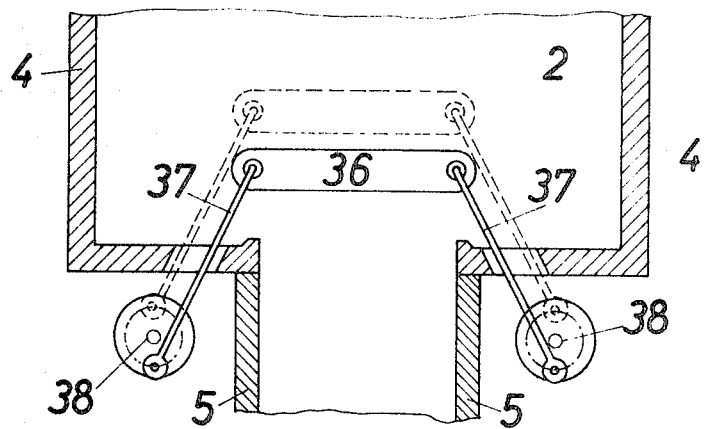
Figure 7:
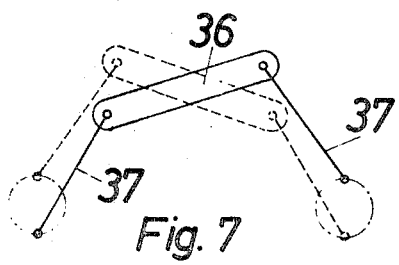
FIGS. 7 and 8 show various possible forms of movement for the float as shown in the embodiment of FIG. 6.
Figure 8:
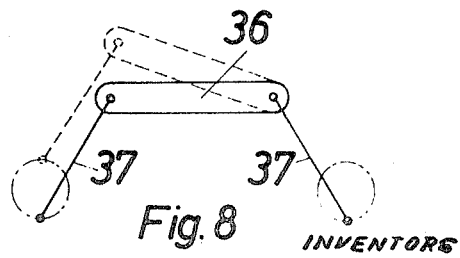

FIG. 5 shows an arrangement in which the float 26 performs the reciprocating rotary movement, that is to say an oscillating movement about a vertical axis. FIG. 6 shows a drive means for the float 36 comprising crankshafts 38 acting on the cooling elements 37. These crankshafts can be driven in different manners so as to achieve either a parallel displacement of the float or a movement which includes a tilting component, as is shown in FIGS. 7 and 8.

It is to be understood that other forms of the invention are possible within the of the following claims.

What we claim is:

1. In apparatus for continuous production of a homogeneous sheet glass strip wherein the glass forming the strip is drawn off from a bulk supply means having an upright wall through a channel being of smaller cross section than the supply means, the improvement comprising:

a float in the glass supply means disposed in spaced relation in front of the channel, said float having an upper portion thereof extending above the upper surface of the glass in said supply means; and cooling element means structurally attached to the upper portion of said float and extending between said float and the adjacent upright wall of the supply means to maintain said float in fixed position in the upper surface of the glass in said supply means, said cooling element means disposed in spaced heat exchange relation adjacently above the upper surface of the glass in said supply means to effect a cooling of the glass surface passing thereunder only between said float and the adjacent walls of said supply means.

2. Apparatus according to claim 1 wherein said cooling element means includes tube means for conducting a cooling medium therethrough.

3. Apparatus according to claim 1 wherein said float is of elongate form and of a length approximately equal to the width of the channel.

4. Apparatus according to claim 1 including means attached to said cooling element means for vertically adjusting the height of said float.

5. Apparatus according to claim 1 including means attached to said cooling element means for vertically adjusting the height of said cooling element means.

6. Apparatus according to claim 1 including means connected to said float for imparting reciprocating movement thereto.

7. Apparatus according to claim 6 wherein said means for reciprocating said float is effective to reciprocate said float along a straight line.

8. Apparatus according to claim 6 wherein said means for reciprocating said float is effective to reciprocate said float along a curved path.

9. Apparatus according to claim 6 wherein said reciprocating means includes a rotating eccentric drive means, and linkage means coupled between said drive means and said float.